United States Patent

[11] 3,575,609

[72] Inventor Hideki Dan Izumi
San Jose, Calif.
[21] Appl. No. 828,246
[22] Filed May 27, 1969
[45] Patented Apr. 20, 1971
[73] Assignee National Semiconductor Corp.
Santa Clara, Calif.

[54] TWO PHASE ULTRA-FAST MICROPOWER DYNAMIC SHIFT REGISTER
10 Claims, 5 Drawing Figs.

[52] U.S. Cl. .......... 307/221, 307/279, 307/208, 307/304
[51] Int. Cl. .......... G11c 19/00
[50] Field of Search .......... 307/208, 205, 251, 279, 221, 304

[56] References Cited
UNITED STATES PATENTS
3,322,974 5/1967 Ahrons et al. .......... 307/304
3,497,715 2/1970 Yen .......... 307/205

*Primary Examiner*—John S. Heyman
*Attorney*—Harvey G. Lowhurst

ABSTRACT: A high-speed integrated circuit shift register cell utilizing six field-effect transistor devices and two clock phase inputs. The six transistor devices include two switching elements, two logic control elements and the respective clock inputs alternate to simultaneously provide a charging path and a ground path for respectively charging and discharging certain PN junction capacitances in the circuit so as to cause an input digital data bit to transverse through the cell in a predetermined time interval.

INVENTOR
HIDEKI DAN IZUMI
BY
ATTORNEY

INVENTOR
HIDEKI DAN IZUMI

BY [signature]

ATTORNEY

TWO PHASE ULTRA-FAST MICROPOWER DYNAMIC SHIFT REGISTER

BACKGROUND OF THE INVENTION

The present invention relates generally to integrated circuit data handling apparatus and, more particularly, to a novel high-speed two clock phase dynamic shift register cell.

There are, at present, two principal problem areas associated with integrated shift register cells. The first is one of high-power dissipation and the other involves the number of clocking inputs required for operation of the circuits. In order to solve the high-power dissipation problems, the current techniques require additional circuit components and this, of course, requires additional chip area. Available integrated circuit devices of this type having low chip area requirements suffer from the disadvantage of high-power dissipation at high operating frequencies. This is caused by the required presence of a direct DC impedance path to ground during the active clock transition.

Present shift register cells which provide the desirable features of both low-power and low chip area, in most instances, require additional clock lines. These systems usually require the use of a four-phase clocking scheme which greatly complicates the drive requirements. That is, the user is forced to provide four clock buffers to obtain high frequency operation. Although in the four-phase clock system two of the clocks can be generated internally, this scheme consumes considerable power in addition to greatly reducing the maximum operating speed of the device. The disadvantages of the present devices are therefore quite apparent, i.e., in order to obtain a low-power high-speed register, one must trade off valuable chip area and utilize a four-phase clocking scheme.

OBJECTS OF THE PRESENT INVENTION

It is therefore a principal object of the present invention to provide a novel low-power high-speed integrated circuit shift register device having a minimum number of operative components and requiring only a two-phase clocking input.

Another object of the present invention is to provide a novel integrated circuit data storage cell which is compact in size and has low-power dissipation characteristics.

Still another object of the present invention is to provide a novel high-speed integrated data storage cell which requires only two clock phase inputs, is compact in physical size, and has low-power dissipation characteristics.

SUMMARY OF THE PRESENT INVENTION

In accordance with the present invention there is provided a novel high-speed integrated circuit shift register cell utilizing field effect transistor (FET) devices and two clock phase inputs. The six transistors include two switching elements, two precharging elements and two logic control elements and the respective clock inputs alternate to simultaneously provide a charging path and a ground path for respectively charging and discharging certain inherent PN junction capacitances within the circuit. An input data bit transverses through the cell in a predetermined time interval.

A plurality of the cells provided in accordance with the present invention can be serially arrayed and incorporated into a given integrated circuit to provide a delay line capable of delaying an input signal for any predetermined period of time.

The shift register cell of the present invention has the advantageous characteristics of low power and high speed inherent in a four-phase system. In addition, the unique circuit mechanization of the novel ultrafast micropower register cell significantly improves on some disadvantages of the four-phase system. Among these improvements are:

1. only a two-phase clocking system is required to operate the system;
2. minimum geometry operative devices are used throughout the cell;
3. the component density per cell area is increased substantially; and
4. the input drive requirements are reduced to one-half that required by the prior art four-phase system. The utility of the present invention will become apparent to those of skill in the art after having read the following detailed disclosure of a preferred embodiment which is illustrated in the several FIGS. of the drawing.

IN THE DRAWING

DETAILED DESCRIPTION OF A PREFERRED EMBODIMENT

Figure 1:
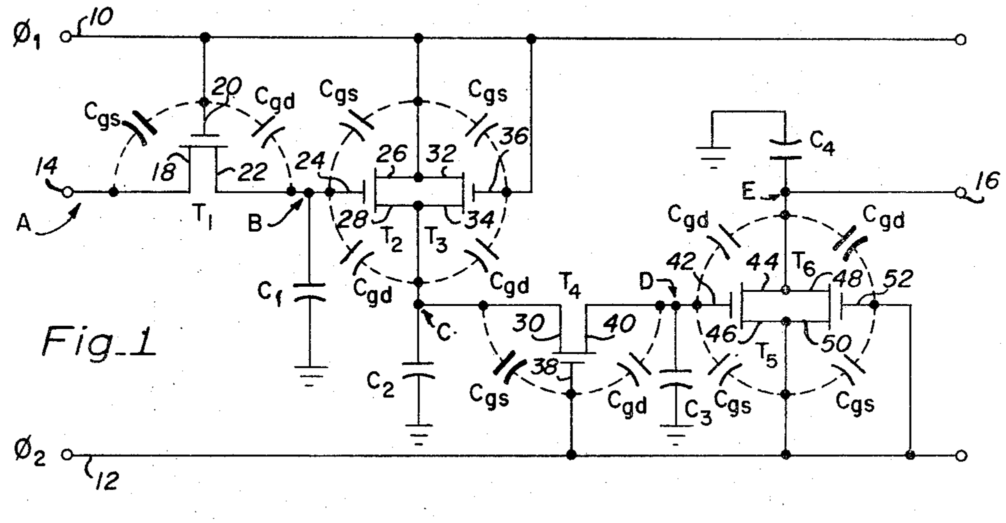
FIG. 1 is a schematic diagram of a shift register cell in accordance with the present invention.

Referring now to the drawing, there is shown in FIG. 1, in schematic diagram form, a pair of clock input lines 10 and 12 to which a pair of clock inputs Φ1 and Φ2 may be applied. A digital input signal may be applied to the circuit at terminal 14 and may be extracted from the circuit after a predetermined delay period at output terminal 16.

As illustrated, the input terminal 14 is connected to the source 18 of a first FET $T_1$. The gate 20 of $T_1$ is connected to the clock line 10 and the drain 22 thereof is directly connected to the gate 24 of a second FET $T_2$ having its source 26 connected to the clock line 10 and its drain 28 connected to the source 30 of a fourth FET $T_4$. The source 26 of FET $T_2$ is also connected to the source 32 of a third FET $T_3$ which in turn has its drain 34 connected to the drain 28 of $T_2$. The gate 36 of $T_3$ is directly connected to the clock line 10.

The gate 38 of $T_4$ is connected to the clock line 12 and its drain 40 is directly coupled to the gate 42 of a fifth FET $T_5$ having its drain 44 coupled to the output terminal 16. Source 46 of $T_5$ is directly coupled to the clock line 12. The sixth FET $T_6$ has its drain 48 coupled to the drain 44 of $T_5$ and its source 50 coupled to the source 46 of $T_5$. The gate 52 thereof is coupled to the clock line 12.

Connected in the circuit at the points B, C, D, and E there are shown capacitances $C_1$, $C_2$, $C_3$, and $C_4$ respectively which will be explained in more detail below. Coupled between the gate and source, and gate and drain of each of the FETs there are shown certain capacitances $C_{gs}$ and $C_{gd}$ which will also be explained below.

The operation of the circuit of FIG. 1 may be explained with reference to the timing diagram shown in FIG. 2. With clock inputs Φ1 and Φ2, which are 90° out of phase relative to each other, applied to the clock lines 10 and 12 respectively, and a logic input such as illustrated in part *c* of FIG. 2, the wave form illustrated in parts *d*, *e*, *F*, and *g* may be observed at the nodes B, C, D, and E respectively in the circuit of FIG. 1.

Basically, the circuit performs two major functions. The first function is that provided by transistors $T_1$ and $T_4$, which acts as signal coupling devices. When switched ON, $T_1$ couples the input signal from input terminal 14 into storage capacitance $C_1$, and $T_4$ couples the energy stored in capacitance $C_2$ into the storage capacitance $C_3$. The other transistors $T_2$ and $T_3$, and $T_5$ and $T_6$ can be referred to as charging and discharging elements the operation of which can best be described by way of an operational example.

With a logic 1, which is defined in terms of MOS technology as a voltage more negative than a logic 0, applied to the input terminal 14 the transistor $T_1$ is initially nonconductive or OFF. However, when the first clock pulse 60, of the clock phase 1, is applied to the gate 20, $T_1$ is caused to conduct and charge capacitance $C_1$ to the logic 1 state as shown at 62 in part *d* of FIG. 2. Thus, with $T_1$ ON node B is raised to a logic 1 level.

Since the gate 24 of $T_2$ is directly coupled to node B, it will likewise be in a logic 1 state causing $T_2$ to turn ON. Similarly, the gate 36 of $T_3$ is raised to a logic 1 level since it is connected directly to the clock line 10 and $T_3$ is ON. Therefore, the result is to provide a charging path through both $T_2$ and $T_3$ from clock line 10 to precharge capacitance $C_2$ to a logic 1 state as shown in part *e* of FIG. 2.

However, when the clock phase Φ1 goes back to the logic 0 level such that line 10 looks like a circuit ground, the transistor $T_3$ is caused to turn OFF. But, $T_2$ remains ON because of potential stored on $C_1$. The effect then, is to discharge $C_2$ back to a logic 0 state through $T_2$.

Figure 2:
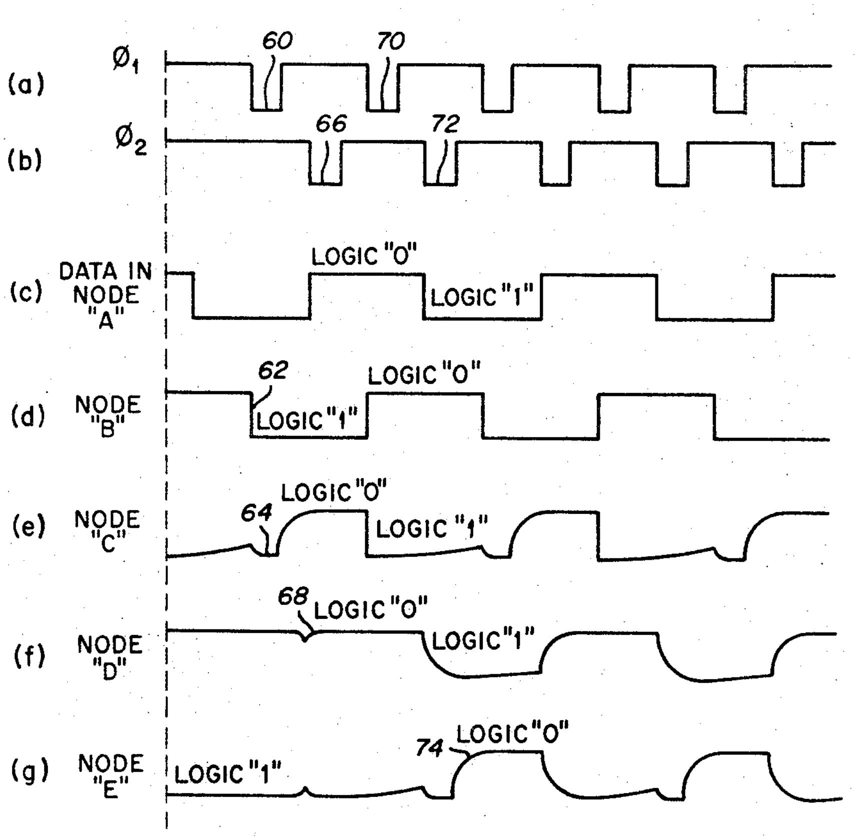
FIG. 2 is a timing diagram illustrating the waveforms which appear at selected points in the circuit of FIG. 1.

A short time afterwards, the clock line 12 which was heretofore in a logic 0 state will go to a logic 1 state as shown at 66 (part *b* of FIG. 2). At the same time the digital input signal applied at terminal 14 goes to logic 0. With clock line 12 now at the logic 1 state, the transistor $T_4$ is turned ON and will convey charge stored in capacitor $C_2$ into capacitor $C_3$. However, because $T_2$ remained on after $C_2$ was initially charged, $C_2$ goes not have any charge stored therein and capacitor $C_3$ will remain in the logic 0 state as shown at 68 in part *f* of FIG. 2.

Since node D is presently at a logic 0 state, $T_5$ cannot turn ON, but since the gate 52 of $T_6$ is directly connected to clock line 12 which is at a logic 1 level, $T_6$ will be turned ON and capacitor $C_4$ will be charged to a logic 1 state if it is not already so charged. At the end of the clock pulse 66 which is applied to clock line 12, $T_4$ and $T_6$ are again turned OFF as the potential at their gates is returned to zero, and $T_5$ remains OFF since there is no charge stored on capacitor $C_3$.

Shortly thereafter, clock line 10 is again driven to a logic 1 state by pulse 70 causing $T_1$ to turn ON and discharge capacitor $C_1$ back to a logic 0 state. This causes transistor $T_2$ to turn OFF, but pulse 70 causes $T_3$ to turn ON so that capacitor $C_2$ is charged to a logic 1 state through $T_3$. At the end of pulse 70, transistors $T_1$ and $T_3$ are again turned OFF and capacitor $C_1$ remains at a logic zero state. But now, $T_2$ remains OFF because of the lack of charge on $C_1$ and capacitor $C_2$ remains charged to the logic 1 state.

Shortly thereafter when clock line 12 is driven to a logic 1 state by pulse 72, transistor $T_4$ is turned ON and the capacitance $C_2$ is discharged into capacitance $C_3$ through $T_4$ so as to cause node D to go to a logic 1 state. This turns ON $T_5$ and the pulse 72 on line 12 turns ON $T_6$ to drive the capacitance $C_4$ to a logic 1 state. However, as pulse 72 terminates and transistors $T_4$ and $T_6$ turn OFF, transistor $T_5$ is caused to remain ON because of the charge stored in capacitance $C_3$, and capacitance $C_4$ which has heretofore been maintained at a logic 1 state is allowed to discharge through $T_5$ into the line 12 so that node E goes to a logic 0 state as shown at 74 in part *g* of FIG. 2.

Thus, it will be noted that the logic 1 input signal previously applied to terminal 14 has been shifted through the circuit to the output terminal 16 in one clock period or, in other words, has been delayed by one clock period. Therefore, in order to provide any predetermined signal delay of $X$ clock periods, all one need do is cascade ($X$–1) stages of the type illustrated in FIG. 1 to the output terminal 16 and the signal which will be caused to appear at the output terminal terminal of the last stage thereof will be delayed by $X$ clock periods from the time it was inserted at input terminal 14.

Figure 3:
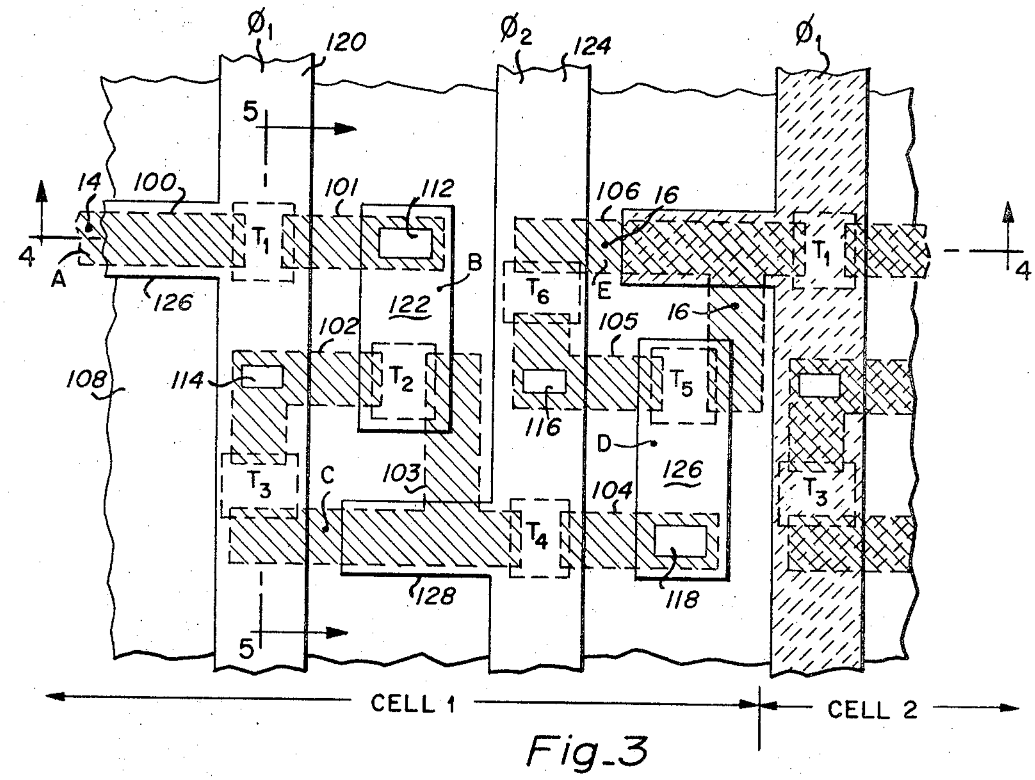
FIG. 3 is a plan view illustrating an integrated circuit shift register cell in accordance with the present invention.
Figure 4:
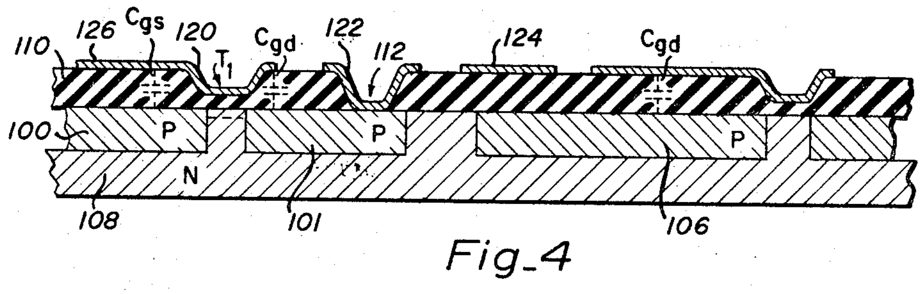
FIG. 4 is a cross section taken along the line 4–4 of FIG. 3.
Figure 5:
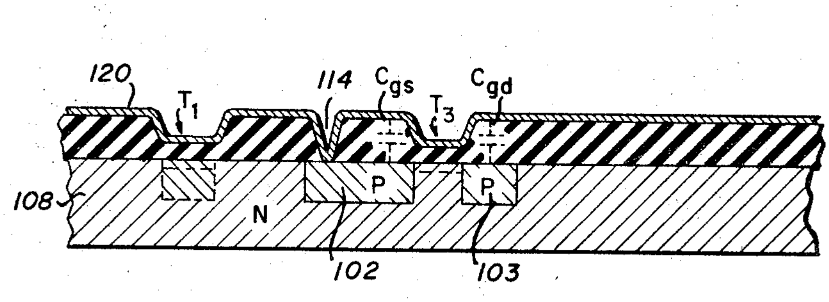
FIG. 5 is a cross section taken along the lines 5–5 of FIG. 3.

Turning now to FIGS. 3, 4, and 5 of the drawing, an actual physical embodiment of the invention in integrated circuit form will be described. In this embodiment, a plurality of p-type regions 100—106 are diffused into an n-type substrate 108 as illustrated by any of the well-known integrated circuit processes. An oxide coating 110 is then grown over the entire chip and the gate areas $T_1$–$T_6$ and contact areas 112—118 are etched through the layer 110 in accordance with well-known techniques. The metal interconnects 120—126 are then deposited, etched, and alloyed over the chip surface to form the desired gates, interconnects and ohmic contacts.

In the form illustrated, the input terminal 14 illustrated in FIG. 1 is connected to the p-region 100 and the output terminal 16 of the FIG. 1 circuit is connected to the p-region 106. The metal interconnect 120 is for the clock phase Φ1 and the interconnect 124 is the clock phase Φ2. The interconnects 120 and 124 are provided with lateral tabs 126 and 128 respectively which extend over portions of the p-regions 100 and 103. These tabs are to increase the gate-to-source capacitance of transistors $T_1$ and $T_4$ so as to couple additional energy from the clock lines 120 and 124 into the capacitance $C_2$ and $C_4$ in order to restore the energy drained therefrom into the following capacitances.

It will be noted that the capacitances $C_1$, $C_2$, $C_3$ and $C_4$ illustrated in FIG. 1 of the drawing are not shown as discrete elements in FIGS. 3, 4, and 5. These capacitances are the junction capacitances which naturally occur in an integrated circuit across the various PN junctions and are inherent components of the circuit. This a particularly advantageous feature in the embodiment of the present invention since no discrete capacitances need be provided. The capacitances $C_{gs}$ and $C_{gd}$ shown in FIGS. 1, 4 and 5 in phantom lines are the inherent capacitances between the gate and source, the gate and drain, respectively, of the various insulated gate FETs.

It will be noted from the embodiment illustrated in FIG. 3 of the drawing that the particular chip layout lends itself well to linear repetition across the chip surface so that a plurality of like cells can be very compactly arrayed over a given chip to allow maximum utility of the available chip area. The double cross hatched area on the right side of FIG. 3 are the $T_1$ and $T_3$ components of a second cell arrayed in series with the cell which was described in detail.

In accordance with a preferred embodiment of the invention the total chip area required for each cell is approximately 13.34 square mils. This is due to the fact that minimum geometry devices can be used for all of the FETs of the cell since no direct DC path to ground is required in the circuit. The power required to operate the cell is minimal and is only that necessary to charge the various intrinsic capacitances associated with the nodes A–E. As an example, the intended power dissipation of each cell is less than 0.150 mw/bit at frequencies greater than $18MH_2$. The preferred operating range of the disclosed cell is above $30MH_z$.

After having read the above disclosure, many alterations and modifications of the invention will be apparent to those of skill in the art. It is therefore to be understood that this description of a preferred embodiment is for purposes of illustration only and is in no manner intended to be limiting in any way. Accordingly, I intend that the appended claims be interpreted as covering all modifications which fall within the true spirit and scope of my invention.

I claim:

1. Data storage circuit apparatus comprising:

first, second and third terminal means for respectively receiving first, second and third discrete input signals;

first signal storage means;

first switching means responsive to said first input signal and operative to couple said second terminal means to said first signal storage means;

second signal storage means;

second switching means having a first pair of control inputs for receiving respectively, a signal stored in said first signal storage means and said first input signal, said second switching means being operative to couple said first terminal means to said second storage means in response to a signal applied to either of said first pair of control inputs;

third signal storage means;

third switching means responsive to said third input signal and operative to couple signals stored in said second signal storage means into said third signal storage means;

fourth signal storage means;

fourth switching means having a second pair of control inputs for receiving a signal stored in said third signal storage means and said third input signal, said fourth switching means being operative to couple said third terminal means to said fourth storage means in response to a signal applied to either of said second pair of control inputs; and output terminal means coupled to said fourth signal storage means.

2. Data storage circuit apparatus as recited in claim 1 wherein said switching means are field-effect transistor means.

3. Data storage circuit apparatus as recited in claim 2 wherein said first and third switching means are respectively comprised of a single field-effect transistor means and said second and fourth switching means are respectively comprised of two field-effect transistor means connected in parallel.

4. Data storage circuit apparatus as recited in claim 3 wherein said circuit apparatus is an integrated circuit means formed on a single chip of semiconductive material.

5. Data storage circuit apparatus as recited in claim 4 wherein said signal storage means are comprised of certain inherent PN junction capacitances of the respective integrated circuit components.

6. Data storage circuit apparatus as recited in claim 5 wherein said first and third input signals are clock phase signals which are respectively 90° out of phase with each other, and said second input signal is a digital input signal whereby said data storage circuit apparatus acts as a high-speed two clock phase dynamic shift register cell.

7. An integrated circuit shift register apparatus comprised of an array of a plurality of shift register cells as recited in claim 6, all of said cells being disposed on a single chip of semiconductive material.

8. Integrated circuit shift register apparatus for causing an input signal to be delayed by a predetermined interval of time comprising:

a first clock phase interconnect means and a second clock phase interconnect means;

input terminal means and output terminal means;

first FET means having a first gate, a first source and a first drain, said first gate being coupled to said first interconnect means and said first source being coupled to said input terminal means;

second FET means having a second gate, a second source and a second drain, said second gate being coupled to said first drain and said second source being coupled to said first interconnect means;

third FET means having a third gate, a third source and a third drain, said third gate being coupled to said first interconnect means, said third source being coupled to said second source, and said third drain being coupled to said second drain;

fourth FET means having a fourth gate, a fourth source and a fourth drain, said fourth gate being coupled to said second interconnect means and said fourth source being coupled to said second drain and said third drain;

fifth FET means having a fifth gate, a fifth source and a fifth drain, said fifth gate being coupled to said fourth drain, said fifth source being coupled to said second interconnect means, and said fifth drain being coupled to said output terminal means; and sixth FET means having a sixth gate, a sixth source and a sixth drain, said sixth gate and said sixth source being coupled to said second interconnect means and said sixth drain being coupled to said output terminal means.

9. An integrated circuit shift register apparatus as recited in claim 8 wherein the source and drain regions of said FET means are of p-type impurity diffused into an n-type semiconductive substrate.

10. An integrated circuit shift register apparatus as recited in claim 9 wherein said FET means are formed in a single semiconductive wafer and said interconnect means are comprised of metallic strips arrayed parallel to each other over a surface of said wafer and respectively include tablike projections which extend over predetermined portions of the drain regions of said second and third FET means, and said fifth and sixth FET means respectively, so as to increase the gate-to-source capacitance of said first and fourth FET means.